No. 786,229. PATENTED MAR. 28, 1905.
S. MIYATA.
AMUSEMENT APPARATUS.
APPLICATION FILED OCT. 28, 1904.

2 SHEETS—SHEET 1.

Attest:   Inventor.
L. Lee.   Simai Miyata, per
Arthur F. Heaton.   Thomas S. Crane, Atty.

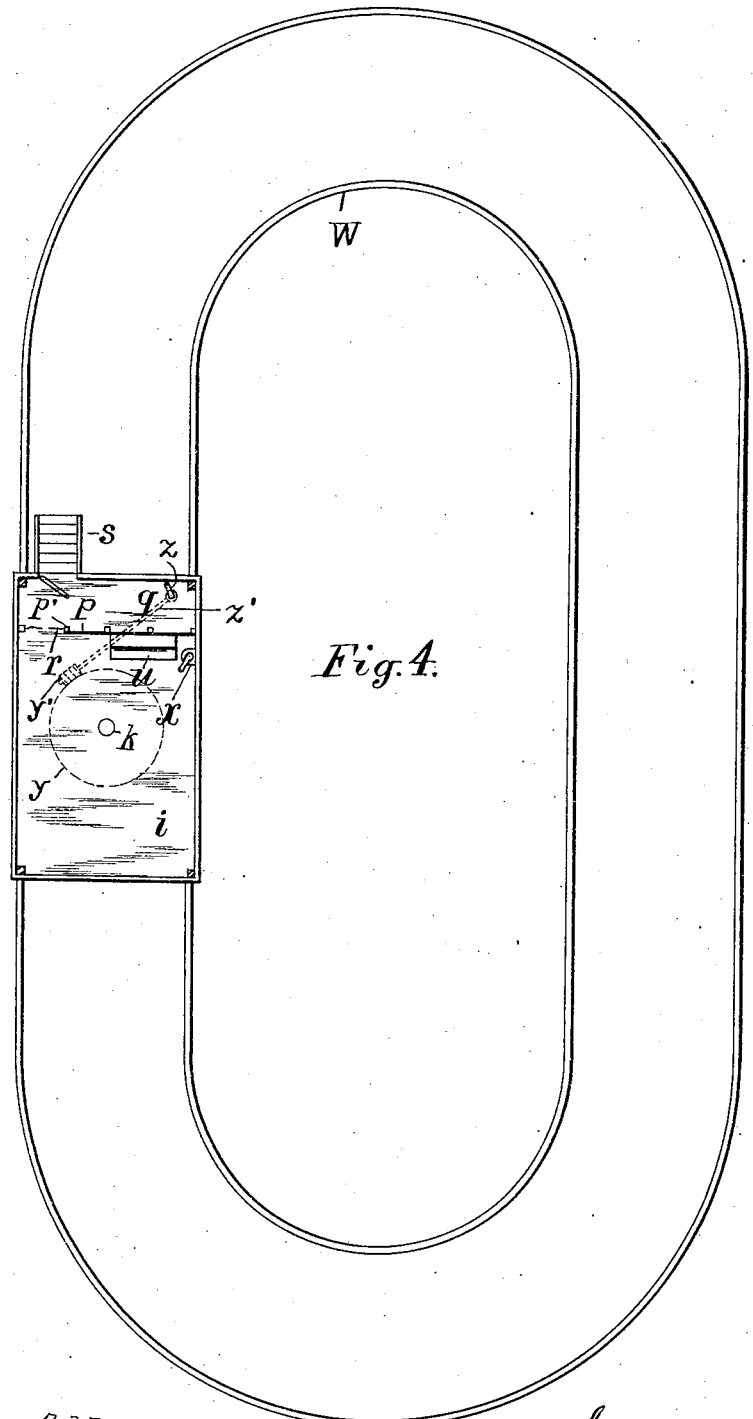

No. 786,229.  
Patented March 28, 1905.

UNITED STATES PATENT OFFICE.

SIMAN MIYATA, OF WEST ORANGE, NEW JERSEY.

AMUSEMENT APPARATUS.

SPECIFICATION forming part of Letters Patent No. 786,229, dated March 28, 1905.

Application filed October 28, 1904. Serial No. 230,433.

*To all whom it may concern:*

Be it known that I, SIMAN MIYATA, a citizen of the United States, whose residence and post-office address is 191 Valley road, West Orange, county of Essex, and State of New Jersey, have invented certain new and useful Improvements in Amusement Apparatus, fully described and represented in the following specification and the accompanying drawings, forming a part of the same.

This invention relates to an apparatus for use in amusement-resorts, by which a platform for dancing is mounted upon wheels to run upon a railway, and is provided with a roof to protect the dancers, a musical instrument to supply the music, and a dressing-room for the use of the dancers. The platform may be made four or more yards square and the truck of suitable size and width to support the same, and the edge of the platform is surrounded only by a railing, balustrade, or parapet, which is preferably of open-work to expose the dancers to view. The dancing-platform is preferably pivoted upon the top of a wheeled truck, so as to be turned around upon the same, and the apparatus is preferably provided with an electric-trolley connection, so that it may be propelled by an electric motor and may be decorated by electric lights. The platform is moved slowly along with its truck while it is employed for dancing and may be turned slowly around upon its truck from time to time, thus serving two purposes—first, the amusement of the dancers themselves by the novel sensation of moving and turning while dancing, and, second, the amusement of spectators, who are not participating. The roof upon the platform is very desirable to protect the dancers from the heat of the sun or from rain in case of sudden showers, and the effectiveness of the apparatus as an amusement device may be greatly increased by extending an ornamental tower above the roof and decorating the same with electric lights, artificial flowers, and other appropriate objects.

Figure 1:
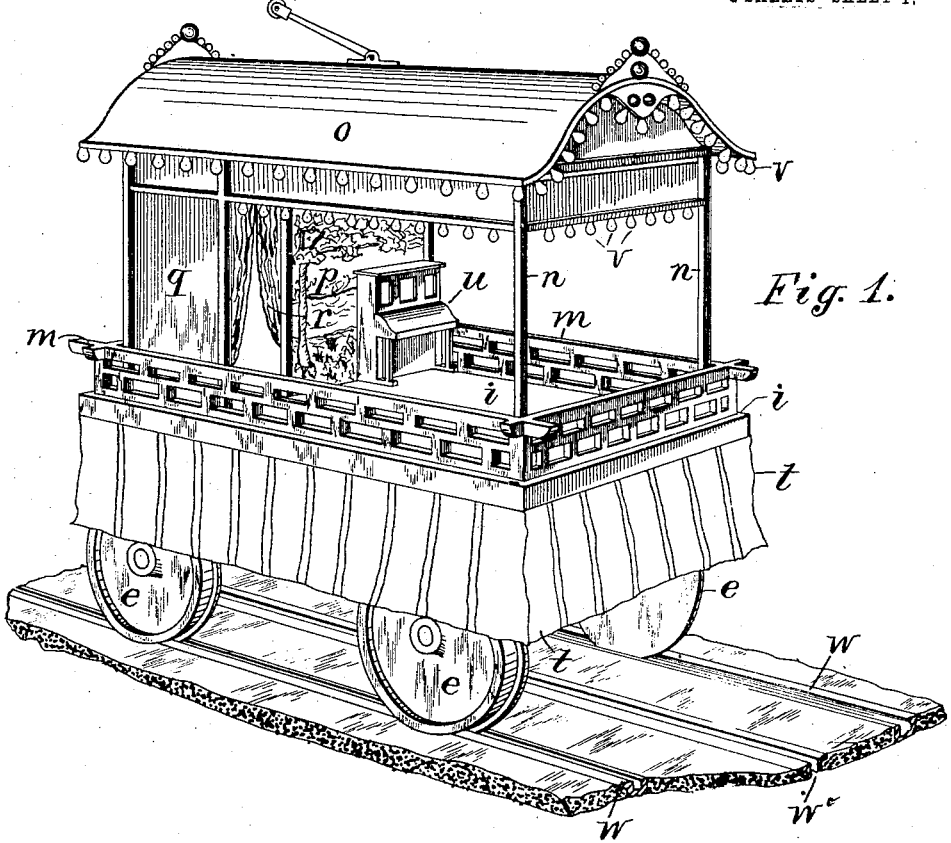
Figures 2, 3:
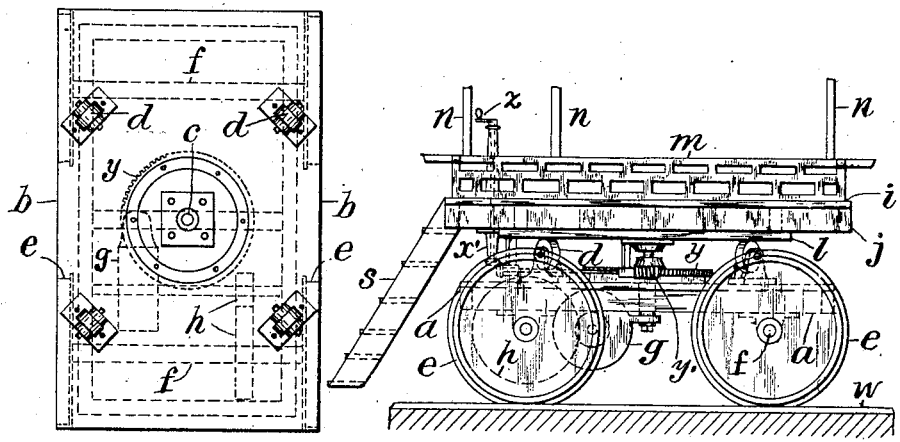

In the annexed drawings, Figure 1 is a perspective view of the apparatus designed in oriental style. Fig. 2 is a plan of the truck. Fig. 3 is a side elevation of the truck and platform with the roof portion broken away; and Fig. 4 is a plan of a closed circuit-track with the apparatus thereon, the roof being omitted from the same.

$a$ designates the frame of a truck, having a floor $b$ upon the top of the same supporting a central socket $c$ and antifriction-wheels $d$. The truck is provided with wheels $e$ upon axles $f$, and an electric motor $g$ is shown connected with one of the axles by gears $h$.

The dancing-platform $i$ is shown with frame $j$ beneath the same having central pivot $k$ to fit the socket $c$ upon the truck. The frame is also provided upon its under side with a seat $l$ to rest upon the antifriction-wheels $d$, and the platform is thus steadied and supported firmly but movably upon the truck. A railing or parapet $m$ surrounds the platform, and posts $n$ support a roof $o$ over the entire platform. A partition $p$ separates one end of the platform from the remainder to form a dressing-room $q$, a doorway with curtains $r$ leading from the dressing-room to the platform. An outer door is extended from the dressing-room to a flight of steps $s$, which are attached firmly to the platform and clear the ground at their lower end to permit the platform being turned around upon the truck. The platform is preferably raised above the ground to a considerable height, so as to give the dancers sufficient elevation to obtain an extended view, and a skirting $t$ is hung from the margin of the platform to conceal the truck and a great part of the wheels. The skirting is shown in Fig. 1 extended over the upper half of the wheels, but in practice may be extended nearly to the ground, so as to entirely conceal the means of support and locomotion. A piano $u$ is shown upon the platform to furnish music for the dancers, and electric lights $v$ are shown applied to the roof and to the roof-frame below the same which is provided to stiffen the posts and hold the roof firmly.

Track-rails $w$ are shown in Fig. 1, to which the wheels $e$ are fitted, and a trolley-slot $w'$ is shown between the rails, through which a trolley-support may be extended to contact with an underground conductor in the manner well known with movable electric cars.

The electric current thus furnished would be supplied to the motor $g$ and to the electric lights $v$, and the car may thus be propelled and decorated by the same electric force. A track W, forming a closed circuit, is shown in Fig. 4 with the platform thereon, and a controller $x$ is shown upon the platform in Figs. 1 and 4 to regulate the movements of the motor. The electric current may at times be derived from an overhead trolley-wire, and a trolley-pole is shown diagrammatically in Fig. 1 upon the roof of the platform, which pole would in practice be made of suitable length to connect with the overhead trolley-wire.

The apparatus furnishes an entirely new diversion for summer-resorts and for the summer season, and to vary the appearance of the dancing-platform partition $p$ may be made (like stage-curtains) to represent scenes of different kinds, and to permit the changing of such scenery from time to time the partition is formed of a movable scene-frame, supported by posts $p$. (Shown in Fig. 4.) Such scene-frames are made interchangeable, so as to fit in the same place against the posts from time to time, as may be desired.

To turn the large platform readily upon the truck, a worm-wheel $y$ is fastened upon the truck and a worm $y'$ is mounted in bearings $x'$ upon the under side of the platform and rotated by means of shafts and bevel-gears connected with a hand-crank $z$, as shown in Figs. 3 and 4. This hand-crank is shown for convenience located in the dressing-room, but may be arranged on any part of the platform.

Having thus set forth the nature of the invention, what is claimed herein is—

1. An amusement apparatus comprising a section of railway-track, a wheeled truck with electric motor for propelling the same, a dancing-platform pivoted to turn upon the truck with antifriction-wheel for steadying the same, a railing only, surrounding the platform, a roof carried by the platform to protect the dancers, a musical instrument upon the platform to direct the dancing, electric lights for decorating the roof, and an electric-trolley connection for supplying the motor and lights with electric current.

2. An amusement apparatus comprising a dancing-platform, wheels to support the same movably, a partition forming a dressing-room at one end of the platform, with a railing around the edge of the platform, and interchangeable scene-frames forming one side of the partition for varying the decoration of the platform.

3. An amusement apparatus comprising a railway-track, a dancing-platform movable thereon, a railing only, at the edge of the platform, means for propelling the platform upon a truck, a roof upon the platform to protect the dancers, and a dressing-room and musical instrument upon the platform.

4. An amusement apparatus comprising a wheeled truck with electric motor for propelling the same, a dancing-platform pivoted to turn upon the truck with antifriction-wheels for steadying the same, a railing only, surrounding the platform, a roof carried by the platform to protect the dancers, a musical instrument carried by the platform, electric lights for decorating the roof, and an electric-trolley connection for supplying the motor and lights with an electric current.

5. An amusement apparatus comprising a railway-truck, a dancing-platform pivoted upon the truck, antifriction-wheels to support the platform upon the truck and gearing connected with a hand-crank $z$ for turning the platform upon the truck.

6. An amusement apparatus comprising a dancing-platform, wheels to support the same movably, a dressing-room inclosed by partition at one end of the platform, and interchangeable scene-frames forming one side of the partition for varying the decoration of the platform.

In testimony whereof I have hereunto set my hand in the presence of two subscribing witnesses.

SIMAN MIYATA.

Witnesses:
CHIYO MIYATA,
THOMAS S. CRANE.